May 1, 1934.  H. A. DENMIRE  1,956,982
METHOD OF FORMING BEAD FLIPPERS
Filed Feb. 6, 1931  6 Sheets-Sheet 3

INVENTOR
Harold A. Denmire
BY
Evans & McCoy
ATTORNEYS

May 1, 1934.  H. A. DENMIRE  1,956,982
METHOD OF FORMING BEAD FLIPPERS
Filed Feb. 6, 1931  6 Sheets-Sheet 4

INVENTOR
Harold A. Denmire
BY
Evans & McCoy
ATTORNEYS

May 1, 1934.  H. A. DENMIRE  1,956,982
METHOD OF FORMING BEAD FLIPPERS
Filed Feb. 6, 1931  6 Sheets-Sheet 5

INVENTOR
Harold A. Denmire
BY
Evans & McCoy
ATTORNEYS

Patented May 1, 1934

1,956,982

UNITED STATES PATENT OFFICE 1,956,982

METHOD OF FORMING BEAD FLIPPERS

Harold A. Denmire, Akron, Ohio, assignor to The General Tire & Rubber Company, Akron, Ohio, a corporation of Ohio Application February 6, 1931, Serial No. 513,837

17 Claims. (Cl. 154—14)

This invention relates to the method of applying flipper strips to bead cores disclosed in my application Serial No. 339,022 for Bead flipper machine filed February 11, 1929 now Patent 1,871,119 issued Aug. 9, 1932.

One of the objects of this invention is to provide a new and improved method of applying bead flipper strips to bead cores for use in the manufacture of pneumatic tire casings, whereby such bead flippers may be more accurately formed with a saving in material and time.

Another object is to provide a method for forming bead flippers for use in the manufacture of pneumatic tire casings wherein manual labor and the degree of skill required is materially reduced.

Another object is to provide a method of forming bead flippers for use in the manufacture of pneumatic tire casings whereby the fabric of the bead flipper strip is automatically folded around the bead core with the extending sides pressed together to form a substantially true frusto-conical shaped ring.

A further object is to provide a method of forming bead flippers for use in the manufacture of pneumatic tire casings wherein the fabric of the flipper is automatically folded around the bead core and after the folding process is automatically caused to stretch a greater amount at its free marginal edges than at its central portion in order that the same may assume a dish shaped position.

Another object is to provide a method of forming bead flippers for use in the manufacture of pneumatic tire casings which consists in simultaneously rotating a bead core and fabric covering therefor, folding the fabric covering around the bead core, and increasingly stretching the fabric from a minimum amount adjacent to the bead core to a maximum amount at the free marginal edges thereof and subsequently pressing the sides together to form a predetermined frusto-conical shaped flange surrounding the bead core.

With the above and other objects in view which will be clearly apparent from the following description, the present invention consists in certain steps and procedure to be hereinafter described with reference to the accompanying drawings, and then claimed.

A bead flipper for pneumatic tire casings comprises a core consisting of a plurality of steel wires coiled into a ring and preferably enclosed by a fabric covering, and a strip of fabric called a "flipper strip" folded around the core with one edge or flap of the fabric overlapping the other. The extending sides of the strip formed by the overlapped flaps extend, when the tire carcass is built, into and form a part of a wall of a tire carcass. When the flipper is in assembled position in the tire carcass the flange of the flipper assumes a frusto-conical position, or in other words, has a dished appearance.

Heretofore the methods of preparing bead flippers have been slow, cumbersome and costly, partly because of the great amount of manual labor involved and the failure to obtain a uniform product. Furthermore, these methods have not proved satisfactory and efficient because the bead flippers produced were not held to any specified shape and could not be easily assembled to the tire carcass. When the tire builder assembled these previously known flippers to the tire carcass the extending portions of the strip which were frequently improperly formed would distort and would not remain in a frusto-conical shape, and would, as a result of the distortion become entangled with the other parts of the carcass.

It is, therefore, the purpose of the present invention to provide a new and novel method whereby bead flippers can be produced easily and economically, and whereby the flippers produced will be of the correct predetermined size and shape so that they can be easily assembled to the tire carcass with a minimum of time and labor.

The manufacture of bead flippers in accordance with my improved method can best be described by referring to the accompanying drawings which illustrate suitable apparatus for carrying out my invention and in which like numerals refer to like parts throughout the several views. The apparatus illustrated in the drawings comprises in general feeding rolls, fabric folding rolls, forming rolls and suitable mechanism for operating these several rolls, the operation of which will be later described.

The entire structure is preferably supported on a column 1 having a base. The column 1 carries a motor support 2, a gear assembly supporting bracket 3 and a roll supporting bracket 4. Power for operating the apparatus is supplied by a motor 5 mounted on the support 2 and controlled from a starter switch 6 which is provided with the usual start and stop buttons.

Figure 2:
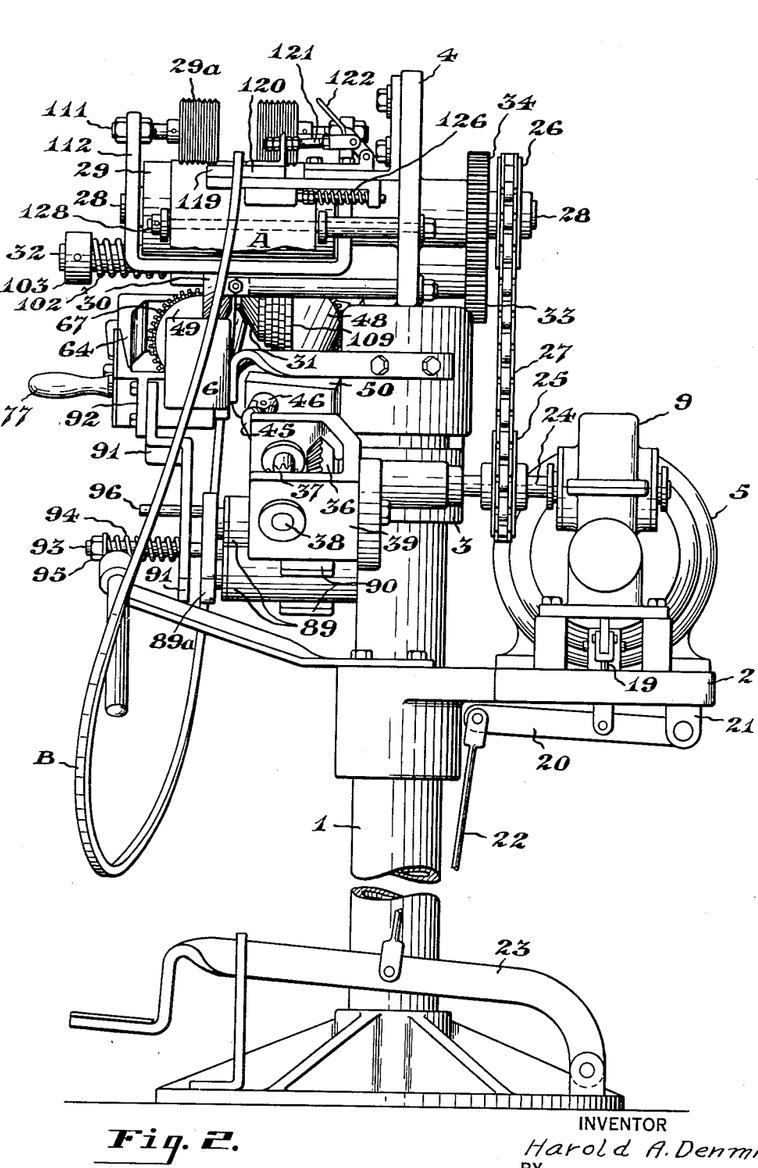
Fig. 2 is an enlarged end elevation of the machine as it appears from looking in the direction of the arrows 2—2 of Fig. 1.
Figure 3:
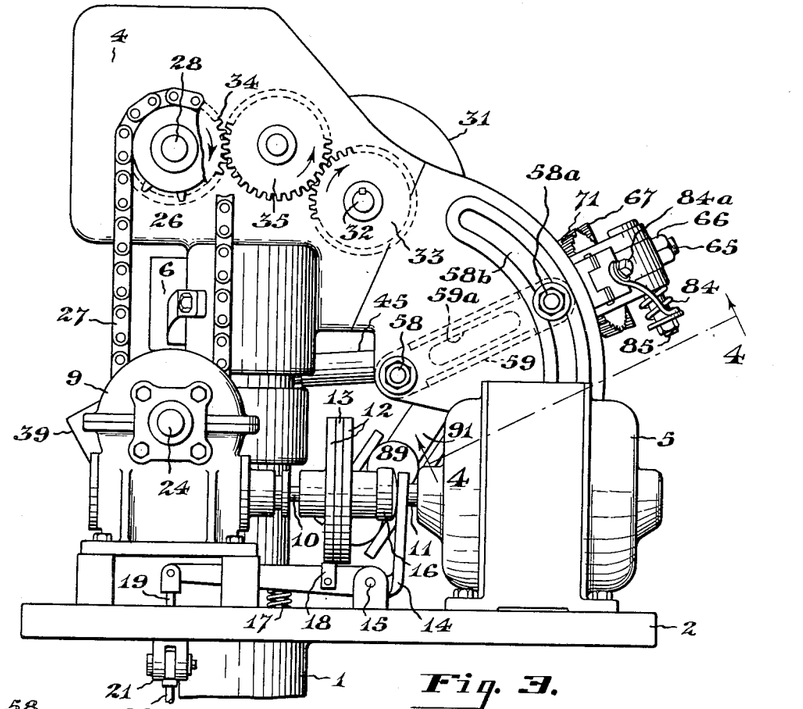
Fig. 3 is an enlarged fragmentary rear elevation of the bead flipper forming machine shown in Figs. 1 and 2.

Referring to Figs. 2 and 3, a housing 9 containing suitable reduction gears (not shown) is mounted upon a motor support 2 with the drive shaft 10 thereof in axial alignment with the drive shaft 11 of the motor 5. The shafts 10 and 11 are each provided with a section 12 of a suitable clutch coupling, and a friction pad 13 is positioned between the coupling sections 12 to transmit power from the motor shaft 11 to the reduction gear drive shaft 10. A bell crank 14 is pivoted by means of a pin 15 to the motor support 2 and this bell crank has one arm thereof in engagement with the thrust bearing 16 carried by the coupling section 12 mounted upon the motor shaft 11. A compression spring 17 is mounted between the other bell crank arm and the motor support 2 normally to force a brake pad 18 into engagement with the coupling section 12 mounted upon the reduction gear drive shaft 10. The last mentioned end of the bell crank arm is pivoted to one end of the rod 19 extending downwardly through the motor support 2, the other end of the rod 19 being pivoted to a horizontal lever 20 intermediate its ends.

Figure 1:
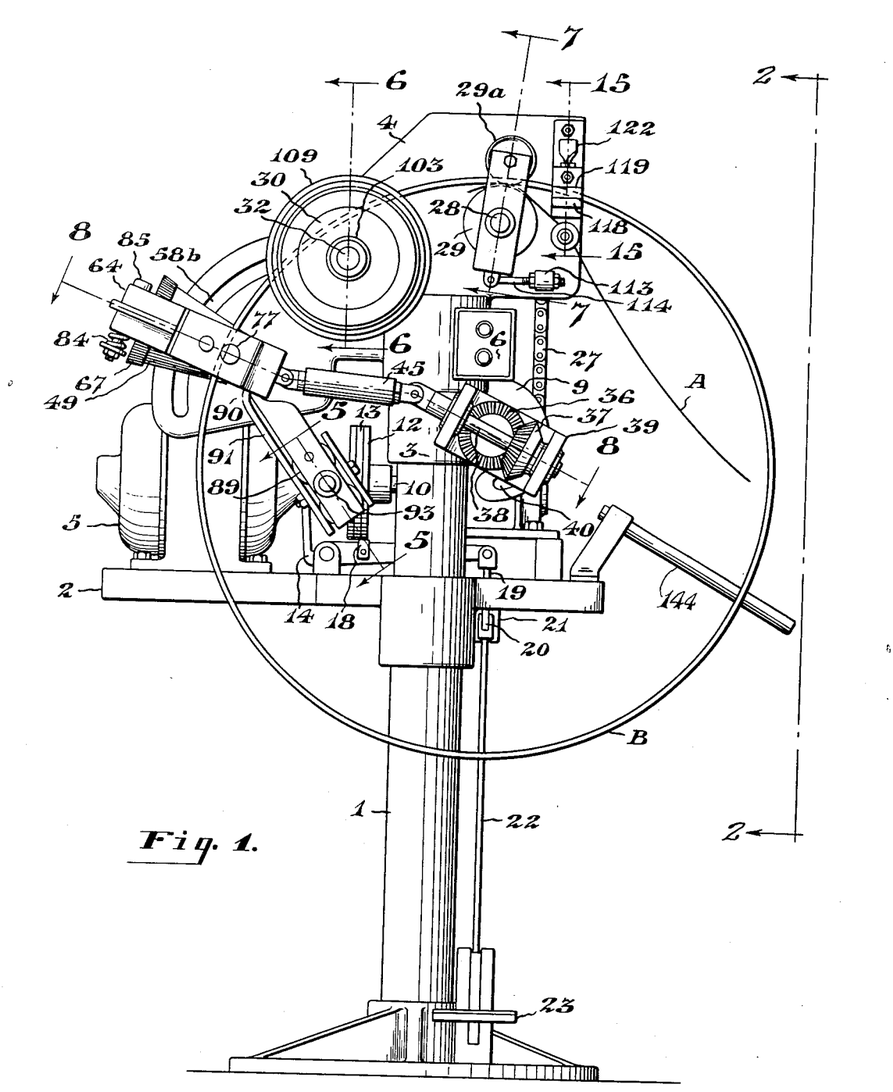
Figure 1 is a front elevation of a bead flipper forming machine, the flipper fabric and bead core being shown in operative position on the machine.

One end of the lever 20 is hinged to a bracket 21 attached to the motor support 2, and the other end thereof is pivoted to a vertical rod 22 which is connected to a foot pedal 23 hinged to the supporting base of the column 1, as shown in Figs. 1 and 3. When the operator of the machine depresses the foot pedal 23 the bell crank 14 is pivoted through the medium of the linkage just described in such a manner that the brake pad 18 is moved away from the coupling section 12 mounted on the shaft 10, and the upwardly extending bell crank arm forces the coupling section on the motor shaft 11 to compress the friction shaft 13 to rigid engagement with the coupling section on the shaft 10, thereby causing the reduction gearing drive shaft to be driven by the motor 5.

The power is thus transmitted at reduced speed from the motor to the reduction gearing driven shaft 24 to drive the mechanism for forming the flipper bead.

A drive sprocket 25 is secured to the shaft 24 and drives a driven sprocket 26 through the medium of a link chain 27, which sprocket 26 is secured to the shaft 28 that extends horizontally through the roll supporting bracket 4 and which is rotatably supported therein. The shaft 28 extends through the bracket 4 to the operating side of the machine to drive the main feed roll 29 which is secured thereto.

Figure 7:
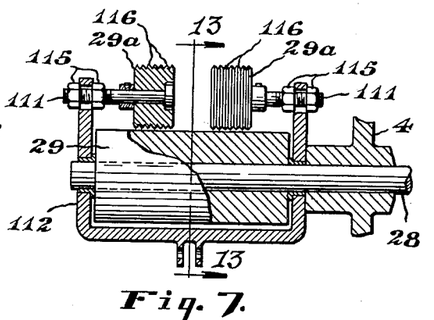
Fig. 7 is an enlarged section taken substantially on the line 7—7 of Fig. 1 showing the feeding rolls.
Figures 11, 12, 13, 14, 15:
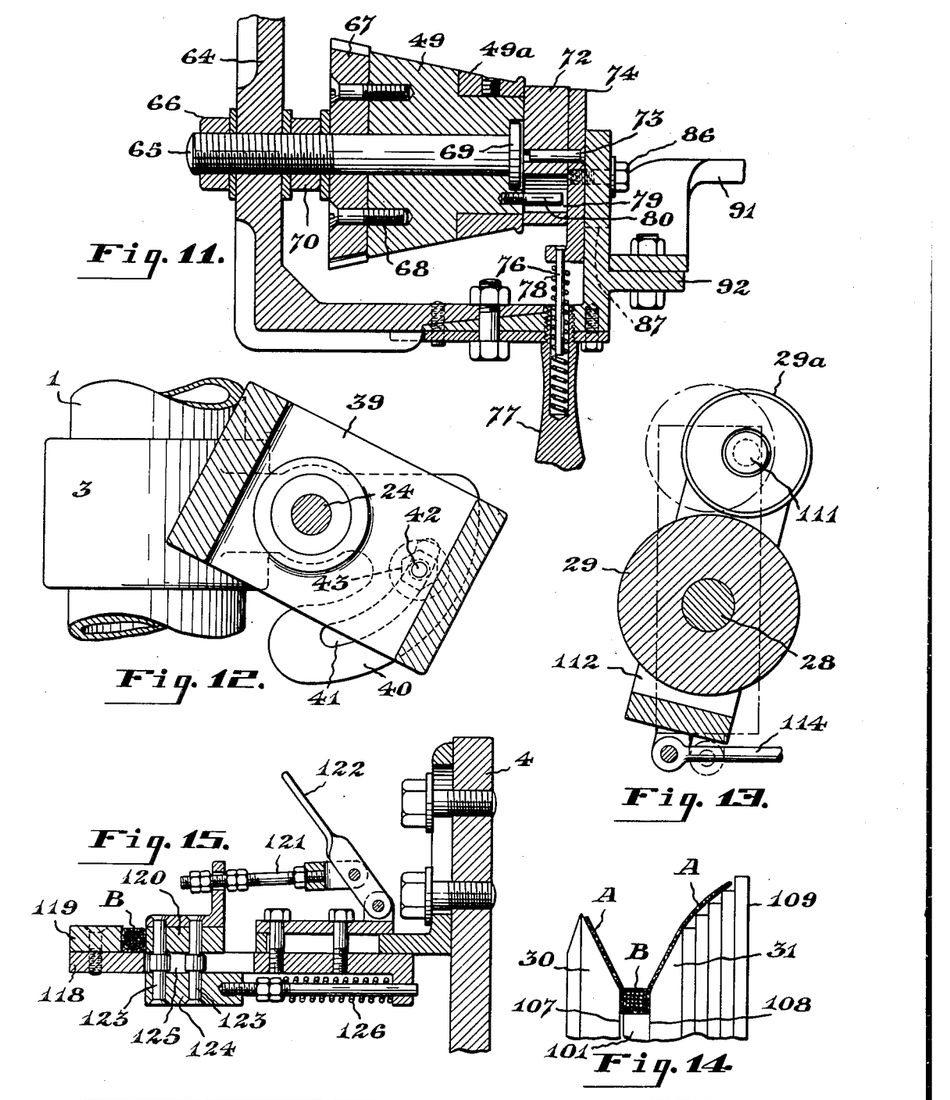
Fig. 11 is an enlarged section taken substantially on the line 11—11 of Fig. 10.
Fig. 12 is an enlarged section taken substantially on the line 12—12 of Fig. 8 showing the adjustable means for the housing which supports the driving gears for the forming rolls.
Fig. 13 is an enlarged section taken substantially on the line 13—13 of Fig. 7 showing the adjusting means for the feeding roll.
Fig. 14 is a fragmentary view of the folding rolls showing the same in operation of folding the flipper fabric about a bead core.
Fig. 15 is an enlarged section taken substantially on the line 15—15 of Fig. 1 showing the means for exerting a slight drag on the bead core during the forming operation.
Figure 18:
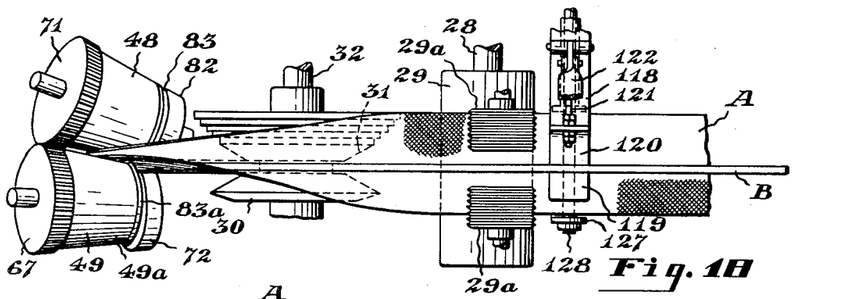
Fig. 18 is a diagrammatic view showing the feeding, folding and forming rolls in plan view and showing a bead flipper in the process of being formed.

In the construction shown in Figs. 7, 13 and 18, the main feed roll 29 is cylindrical throughout its length and extends outwardly from the bracket 4. The feed roll 29 in conjunction with the auxiliary rolls 29ª feeds the fabric A into folding rolls 30 and 31 at a definite speed, the operation of which will be described later in the specification.

The folding rolls 30 and 31 are mounted upon a shaft 32 that extends through the bracket 4 to the rear side thereof parallel to the shaft 28 and which has a spur gear 33 mounted thereon that is driven by a spur gear 34 mounted on the shaft 28 through the intermediary of an auxiliary idler gear 35. The idler gear 35 is provided to mesh with the gears 33 and 34 in order to cause the feed and folding rolls to rotate in the same counter-clockwise direction, as viewed in Figs. 1 and 19.

The shaft 24 which carries the drive sprocket 25 is journaled in the reduction gearing housing 9, and gear supporting bracket 3, and a bevel gear 36 is secured to the end of the same opposite the housing 9. This gear 36 meshes with a mating gear 37 secured to an inclined shaft 38 journaled in a U-shaped housing 39. The housing 39 is formed with an opening between the sides thereof through which the shaft 24 extends, and the gear 36 abuts against the web of the housing to prevent end play of the same, but with sufficient clearance that the housing may be rotated about the shaft 24 as an axis. The gear supporting bracket 3 is formed with an integral projecting quadrant 40 having a slot 41 therein substantially as shown in Fig. 12 through which a pin 42 threaded into the rear web face of the housing 39 extends.

A nut 43 is threaded on the end of the pin 42 so that the housing 39 can be clamped to the gear bracket 3. Upon loosening the nut 43, the housing can be rotated through a substantial arc to vary the angular position of the shaft 38.

Figures 8, 9, 10:
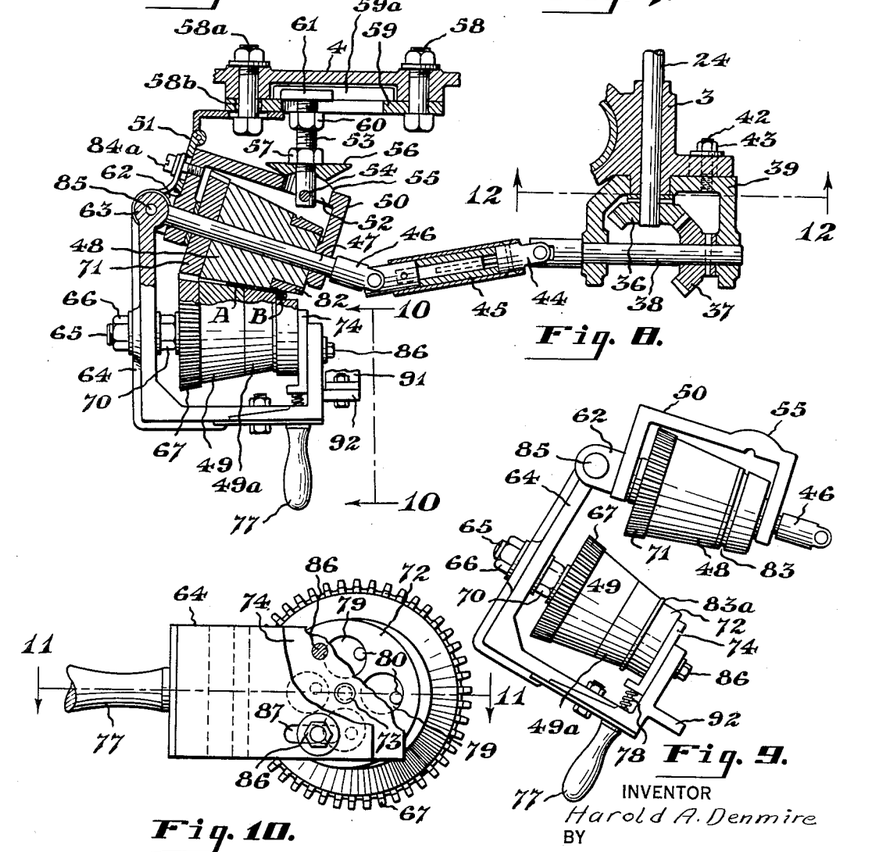
Fig. 8 is an enlarged section taken substantially on the line 8—8 of Fig. 1 showing the driving means for the forming rolls and also showing the forming rolls partially in section.
Fig. 9 is a view showing the forming rolls and their supporting housings in non-operative position.
Fig. 10 is an end view of the movable forming roll and housing taken as looking in the direction of the arrows 10—10 in Fig. 8.

As shown in Fig. 8, one end of the shaft 38 projects beyond the housing 42 and is connected by a universal joint 44 to one end of an extensible shaft 45. The other end of the shaft 45 is universally connected by a joint 46 to the ends of a shaft 47 to which the forming roll 48 is secured, which as will be later described, has a driving connection with the other forming roll 49. The ends of the roll shaft 47 are journaled in the legs of the U-shaped roll housing 50, the housing being supported at one end by a hinge member 51 movably secured to the roll supporting bracket 4. The other end of the housing 50 is formed with an enlarged opening 52 through which the end of the bolt 53 extends.

A pin 54 fixed in the head of the bolt 53 perpendicular to the axis thereof engages the inner surface of the web of the housing 50. A semispherical boss 55 is formed on the outer surface of the housing 50 surrounding the opening 52. A collar 56 having a dished recess therein to engage the boss 55 is mounted upon the bolt 53 and the plane side thereof engages a lock nut 57 threaded on the bolt 53. The bolt 53 extends through a slot 59ª formed in a plate 59 secured to the supporting bracket 4 and is held in adjusted position by the nut 60 and T head 61. The plate 59 is pivoted on a bolt 58 carried by the roll support 4 and is arranged to be swung in an arc about the bolt 58 as an axis. The opposite end of the plate can be set in any desired angular position by a bolt 58ª which extends through an arcuate slot 58ᵇ in the bracket 4, the axis of the slot being that of the pin 58.

The hinge member 51 is secured to the roll supporting bracket 4 by means of the bolt 58ª, as shown in Fig. 8. the slot in the hinge through which the bolt 58ª extends being elongated.

Three adjustments are thus provided for the roll housing 51. By loosening the nut on the bolt 58ª the roll housing can be rotated in an arc in a direction transverse to the feeding and folding roll shafts to adjust the amount of stretch that is to be put into the extending portions of the flipper fabric. This, however, will soon be described in greater detail. By loosening the nut 60 the roll housing 50 can be swung in an arm transversely of the supporting bracket 4 within certain limits to adjust the angularity of the extending portions of the flipper strip relative to the bead core. The third adjustment is to adjust the forming rolls to accommodate different diametered bead flippers. This is accomplished by loosening the nut 60 and bolt 58ª, and bodily moving the roll housing 50 longitudinally of the plate 59.

Extending upwardly from one end of the housing 50 are hinged lugs 62 cooperating with corresponding lugs 63 on the roll housing 64 which carries the forming roll 49 for hingedly attaching the housing 64 to the housing 50. The housing 64 is similar in shape to the housing 51 and is preferably made in two pieces as shown in Fig. 8. A stub shaft 65 is secured to the hinged leg of the housing 64 by means of a nut 66 for rotatably supporting the roll 49. The frusto-conical forming roll 49 having a beveled gear 67 secured to the large end thereof by bolts or screws 68 is rotatably mounted on the stub shaft 65 and is held in position thereon by the enlarged head 69 of the shaft 65 and a spacer member 70.

The roll 49 is driven from the forming roll 48 by means of a gear 71 mounted on the roll 48 which meshes with the bevel gear 67 when the roll housings 64 and 50 are in closed position, and because the gears have the same fixed diameters the rolls 48 and 49 will rotate at the same relative speed. The end of the forming roll 49 is formed with a removable collar 49ª for a purpose to be later described.

A cylindrical auxiliary forming roll 72 is rotatably mounted on a short stub shaft 73 carried by a slide 74 slidably engaging the inner face of the free leg of the housing 64. The slide 74 is provided with a pin 76 which extends into a hollow handle 77 secured to a portion of the housing 64, the compression spring 78 being provided in the hollow handle 77 to bear against the slide 74 to yieldably urge the auxiliary roll 72 into a position coaxial with the roll 49.

The auxiliary roll 72, as shown in Fig. 8, bears against the small diametered end face of the roll 49 and has a plurality of circular openings 79 therein presenting toward the end face of the roll 49. A plurality of driving pins 80 having the same spacing as the openings 79 are secured to the small diametered end of the roll 49 to project into the openings 79.

The driving pins 80 are much smaller in diameter than the circular recesses 79 into which they extend, and consequently allow the auxiliary roll 72 to rotate eccentrically relative to the forming roll 49, the axes of the rolls 49 and 72 however remaining parallel. It is evident that for any amount of eccentricity the auxiliary roll 72 will rotate at the same speed as the roll 49 because of the engagement of the driving pins 80 with the walls of the circular openings 79. The slide 74 is held in sliding contact with the adjacent leg of the housing 64 by cap screws 86 which move in slots 87 formed in the leg of the housing. The screws being movable in the slots 87 permits lateral movement of the axis of the auxiliary roll 72. This movement, however, is yieldably resisted by the spring 78 positioned in the handle 77.

When the roll housings are in closed position, the fabric A of the bead flipper is positioned under tension between the roll 48 and auxiliary roll 72 substantially as shown in Figs. 8 and 18. The core B of the flipper which is of greater thickness than the fabric, forces the auxiliary roll 72 to assume an eccentric position against the pressure of the spring 78. The small end of the roll 48 is formed with a removable collar 82 having a circumferential recess 83 therein which receives a portion of the flipper strip during the forming operation. The operation of this recess in conjunction with a circumferential ridge 83ª formed on the collar 49ª of the roll 49, however, will be later described.

Figures 4, 5:
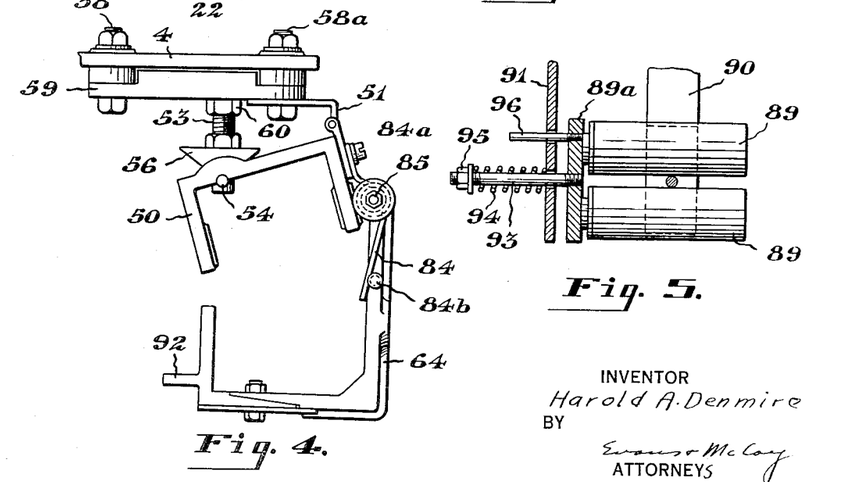
Fig. 4 is an enlarged section taken substantially on the line 4—4 of Fig. 3 showing the means for supporting the forming roll housings, the forming rolls being removed from the housings which are shown in operative position.
Fig. 5 is an enlarged section taken substantially on the line 5—5 of Fig. 1 showing the electromagnet means for holding the forming roll housing in cooperative position.

A torsion spring 84 is coiled around an extension of the hinge pin 85 which pivots the roll housing 64 to the housing 50 and has one end fixed in a clamp member 84ª, as shown in Fig. 4, attached to the roll housing 50, the other end of the spring 84 being seated against a stud 84ᵇ carried by the roll housing 64. This spring 84 maintains the forming roll housings in their normal open position, as shown in Fig. 9.

The roll housing 64 is held in operative position against the torsion of the spring 84 by the action of electromagnets 89 with an armature 89ª as shown in Fig. 5, the electromagnets being mounted on the roll supporting bracket 4 by suitable clamping arms 90, the armature 89ª being yieldably mounted on an arm 91 carried by a lug 92 formed on the roll housing 64. The armature 89a, as more clearly shown in Fig. 5, is carried by a stud 93 extending through an opening in the arm 91, and has the spring 94 thereon compressed by a nut 95 threaded on the end of a stud 93. The nut 95 may be threaded inwardly or outwardly to adjust the pressure of the spring 94. A pin 96 carried by one end of the armature 89a slidably extends through the arm 91 to prevent rotation of the armature 89a.

The electromagnets 89 are positioned in such a manner that when the roll housing 64 is manually moved to closed position, and when the electromagnets are energized, the armature 89a is attracted by the electromagnets 89 and makes contact therewith. Since the armature is yieldably mounted on the arm 91 pressure is thus exerted between the forming rolls 48 and 49 as previously mentioned. The push button switch for controlling the circuit to the motor is also connected into the electric circuit which energizes the electromagnets 89, so that when the circuit is opened by depressing one of the buttons the electromagnets are de-energized, thereby releasing the contact with the armature 89a. The torsion spring 84 then causes the roll housing 64 to swing to its open position.

The folding roll 31 is mounted on the shaft 32 so that it can be adjusted longitudinally of the same, and is provided with a set screw 98 threaded into the hub thereof and adapted to engage the shaft 32 in order to set the roll 31 in any predetermined position. This roll is formed with a frusto-conical outwardly presenting face 99.

Figure 6:
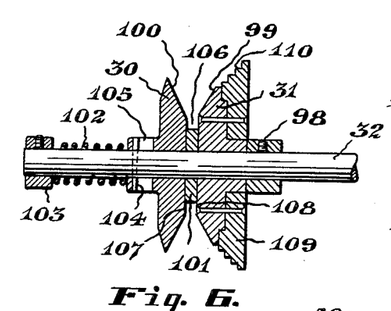
Fig. 6 is an enlarged section taken substantially on the line 6—6 of Fig. 1 showing the folding rolls.

The folding roll 30 is slidably mounted on the shaft 32 and is likewise formed with a frusto-conical face 100 presenting toward the face 99 of the roll 31. The rolls 30 and 31, as shown in Fig. 6, face each other to provide a generally V-shaped notch therebetween. Interposed between the rolls 30 and 31 is a bead driving cylinder 101 which is keyed to the shaft 32.

The folding roll 30 normally abuts against the cylinder 101 and is held in yieldable abutting relation therewith by means of a compression spring 102, one end of which engages the end of the hub of the roll 30 and the other end of which engages a collar 103 securely mounted on the end of the shaft 32. The roll 30 is driven by means of a pin 104 extending transversely of the shaft 32 which engages the side walls of transverse notches 105 formed in its hub.

It can thus be seen that the pin 104 provides a positive driving means for the roll 30 and still allows sliding movement of the same longitudinally of the shaft 32. The frusto-conical faces 99 and 100 of the folding rolls 30 and 31, respectively, form a generally V-shaped groove around their circumference, the bottom of which does not come to a point but has a supplementary groove 106 of rectangular shape defined by the smaller diametered bases 107 and 108 of the rolls 30 and 31, and the surface of the bead driving cylinder 101.

The width of the groove 106 will, of course, vary depending upon the relative positions of the rolls 30 and 31 on the shaft 32. The main purpose of the spring 102 is to force the roll 30 toward the roll 31 so that sufficient tractive effort will be exerted on the core B and fabric A to fold the fabric around the inner and side faces of the core and to allow the fabric to assume a substantial V shape, as shown in Fig. 14.

The primary function of the cylinder 101 is to provide a positive driving means for the bead core and fabric folded therearound. This folding action will be more fully described later in the specification. The shape of the groove 106 does not necessarily have to be rectangular but may be of any desired shape. This, of course, depends somewhat upon the shape of the bead core used in the bead flipper.

A collar 109 is secured to the folding roll 31 and is provided with a stepped face 110 forming a substantial continuation of the face 100 of the roll 31 which operates, as will be later described, when relatively wide flipper strips are employed.

The rolls 29a which operate in conjunction with the main feed roll 29 are mounted in coaxial spaced relation on short stub shafts 111 carried by a U-shaped bracket 112. The bracket 112 is pivotally supported on the main roll drive shaft 28 and is provided with a suitable adjusting means for changing the radial position of the rolls 29a with respect to the main feed roll 29. This adjusting means may comprise, as shown in Fig. 1, a boss 113 carried by the roll supporting plate 41 and a screw 114 mounted in the boss 113 for adjustment relative thereto, the screw 114 being pivoted to the bracket 112. By adjusting the screw 114, the bight of the rolls 29 and 29a on the flipper fabric can be adjusted relative to the contact of the flipper bead core with the flipper fabric, as shown in Fig. 13.

The auxiliary feed rolls 29a are each so mounted on their stub shafts 111 that they can be axially adjusted thereon in order to provide the proper spacing between the rolls 29a for different widths of fabric employed in making different sizes of bead flippers. This is accomplished by providing a nut 115 at each side of each leg of the bracket 112.

Each auxiliary feed roll 29a is formed with a plurality of circumferentially arranged grooves 116 which, when the machine is in operation, permit the excess fabric to gather between the conical puller points of contact of the rolls 29a with the roll 29, and thus prevent excessive crowding of the flipper fabric ahead of the bead core.

By employing the adjustment of the auxiliary feed rolls just described and the circumferential gathering grooves, the device can be arranged so that the bight of the feed rolls on the fabric is just ahead of the point where the flipper fabric engages the inner face of the bead core that is being covered. The device can thus be adjusted for different degrees of gathering in of the flipper fabric at the inner face of the bead core.

Figures 20, 21:
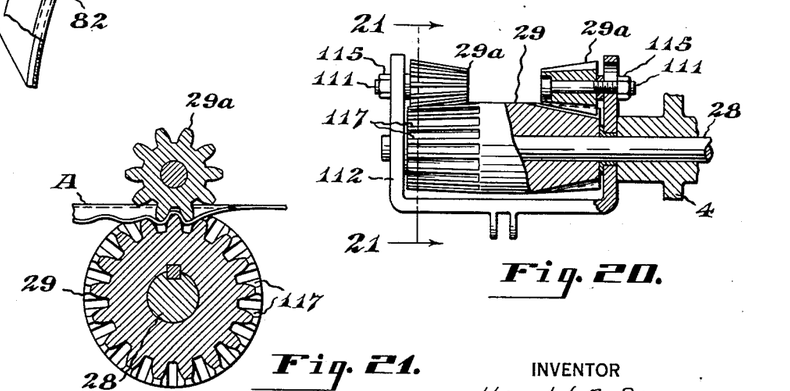
Fig. 20 is a section through the modified types of the main and auxiliary feeding rolls.
Fig. 21 is a section taken on the line 21—21 of Fig. 20.

Modified types of feed roll 29 and auxiliary feed rolls 29a are shown in Fig. 20. In these modified types the main feed roll 29 is made slightly conical at its ends and is formed with flutes or substantial gear teeth 117, which engage with corresponding teeth on the auxiliary feed rolls 29a, the rolls 29a being of frusto-conical shape. The function of these modified rolls is substantially the same as the previously described type. These rolls gather the flipper fabric in such a manner that it is materially stretched at its edges and also crowded in along the inner face of the bead core to provide a very smooth lay of the flipper fabric along the inner face of the bead core.

The bead core, being covered, is supported in advance of the feed roll 29 on an extending arm 118 carried by the roll support 4. This arm has a guide block 119 rigidly mounted thereon for guiding the bead core centrally of the feed roll 29.

A slight drag is exerted on the bead core by resiliently holding it against the guide block 119. This is accomplished by means of an auxiliary block 120 slidably mounted on the arm 118 and connected through a link 121 to a manually operable lever 122. The slidable block 120 is mounted on the upper side of the arm 118 and is connected by means of pins 123 to a bar 124 positioned below the arm 118, the pins 123 being guided in a slot 125 in the arm 118. The bar 124, and consequently the block 120, are resiliently urged toward the block 119 to lightly grip the bead core by means of a coil spring 126 acting against the bar 124. By actuating the lever 122 against the spring pressure, the drag on the core can be relieved.

The flipper fabric A, being fed to the feed roll 29, passes over and is guided by a guide roller 127 that is mounted on a pin 128 carried by the roll support 4.

In describing the method of my invention, it is believed that it will be more clearly understandable by describing the same in connection with the apparatus illustrated, although it is to be understood that this method may be carried out with other types of apparatus.

In the operation of the bead forming apparatus illustrated, the roll housing is swung outwardly to the position shown in Fig. 9, and the bead core B is then placed in position on the main feed roll 29, between the parallel faces of the folding rolls 30 and 31, between the guide blocks 119 and 120, and the current supply for the electromagnets 89 and motor is turned on by operating the switch 6, at which time the roll housing 64 is moved back to its operating position shown in Fig. 8. The electromagnets 89 then hold the housing 64 in position until the flipper bead is completed and the current turned off. In this position the bead core is gripped between the auxiliary portion 82 of the forming roll 48 and the resiliently mounted auxiliary forming roll 72.

The free end of the flipper fabric A is next passed over the guide roller 127 and then between the feed rolls 28 and 29 and underneath the bead core B. The bead core is held out of contact with the edge of the fabric being fed to the machine by means of a suitable guide bar 144, as shown in Figs. 1 and 2.

The apparatus is then placed in operation by depressing the foot pedal 23, which causes the clutch plates to engage and cause the feeding, folding and forming rolls to be set in rotation through the medium of the gearing previously described.

Figures 17, 19:
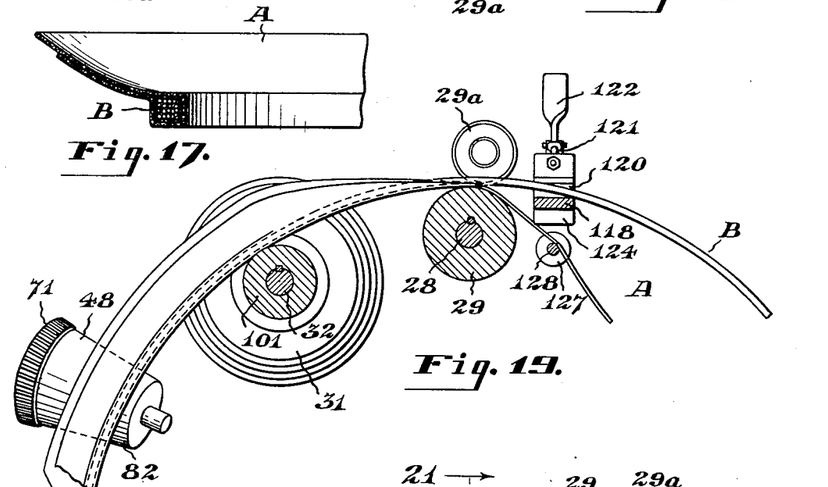
Fig. 17 is an enlarged transverse section of a finished bead flipper.
Fig. 19 is a diagrammatic side elevation of the elements shown in Fig. 18.

The action of the various feeding, folding and forming rolls is illustrated in Figs. 18 and 19. Operation of the apparatus causes the bead core and fabric to rotate about an imaginary center which would be approximately at the apex of the axes of the conical forming rolls 48 and 49.

The flipper strip A is fed into the machine over the guide roller 127 and the core B is guided centrally over the main feed roll 29 by the guide blocks 119 and 120, the core being arranged to substantially engage the friction side of the flipper strip passing over the main feed roll 29 underneath the core B.

Prior to contact between the flipper strip and bead core, the bight of the feed rolls 29 and 29ª occurs which, because of the spaced puller points, gathers the side portions of the flipper strips which are not wrapped around the cores, and thus prevents gathering-in of the flipper strip at the inner circumferential face of the bead core.

The flipper strip and core then pass to the folding rolls 30 and 31, where the strip is folded about the lateral sides and inner edge of the core. This folding action is obtained by the contact of the flipper strip and core with the driving cylinder 101, and the parallel faces 107 and 108 of the folding rolls 30 and 31, the roll 30 which is yieldably mounted for axial movement exerting sufficient lateral pressure to firmly grip the flipper strip and core in a lateral direction.

The diameter of the feed roll 29 is made slightly greater than the diameter of the driving cylinder 101 between the folding rolls so that the peripheral speed of the same is slightly more than the peripheral speed of the cylinder 101. The result is that the flipper strip on the way to the folding rolls 30 and 31 travels at a slightly higher rate of speed than the core. Because of this difference in speed and the drag on the core, the flipper strip as it leaves the folding rolls on its way to the forming rolls 48 and 49 assumes a substantial V-shape above the core, the sides of the flipper strip lying against the divergent faces 99 and 100 of the folding rolls 30 and 31.

The forming rolls, as previously described, are frusto-conical in shape and revolve about intersecting axes and are also positioned so that a plane passing through the substantially adjacent faces of the same is inclined to the vertical—that is, this is not perpendicular to the axis of the bead flipper being formed. It is therefore evident that as the diameters of the forming rolls are increased the peripheral speeds thereof are increased. The speed of the outer edges of the unfolded portions of the flipper strip passing between the forming rolls is greater than the speed of the core, and the portions of the flipper strip folded around the core. In other words, the speed of the unfolded portions of the strip is progressively increased outwardly from the core. The result is readily apparent, as it can be seen that the strip is stretched in an angular direction by the forming rolls and is stretched in increasingly and progressively greater amounts as the diameter is increased. It is desirable that the strip be stretched a maximum amount at the points of greatest diameter so that the flange formed by the engaged flaps of the strip will assume a true and substantially permanent frusto-conical appearance and will not distort subsequent to its application to the tire casing being constructed.

The auxiliary forming roll 72 being in an eccentric position, together with the edge of the roll 49, substantially completes the folding operation by wrapping the fabric around the outer circumferential face of the core, leaving the two flaps which are pressed together by the main portions of the forming rolls and which adhere to each other.

Since these flaps are stretched a minimum amount at their inner edges and a maximum at their outer edges they retain the shape they had while passing between the forming rolls,— that is, they assume the frusto-coincal shape shown in Fig. 17.

Figure 16:
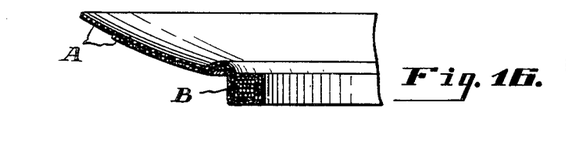
Fig. 16 is an enlarged transverse section of a distorted bead flipper.

The groove 83 formed on the counter portion 82 of the forming roll 48 and the cooperating ridge formed on the corresponding counter portion 49ª of the forming roll 49 crowd the strip during the forming action laterally on the core away from a corner thereof, substantially forming it to the shape shown in Fig. 16, so that when the bead flipper leaves the forming rolls the flaps will be positioned in smooth out-line at one side of the core as shown in Fig. 17. This in fact provides an over correction in the application of the flipper strip to the core which results in a smooth face.

Any desired degree of overlapping of the flaps of the flipper strip is obtained by adjusting the lateral position of the guide spool 127 which will place the unfolded strip in the correct position relative to the core.

Any desired degree of stretch in the overlapping flaps of the flipper strips can be obtained by adjusting the housing 50 to obtain the necessary lateral position of the rolls 48 and 49 to meet that condition, and furthermore, the angle of the overlapping flaps relative to the bead core can be easily obtained by changing the angular position of the housing 50 relative to a vertical plane, as previously described.

When the bead core is nearly covered, the flipper strip is cut and the rotation of the bead flipper is stopped, at which time the end of the flipper strip is overlapped with the end thereof first applied to the core, and the machine is then again set in operation and allowed to operate until the core is completely covered, at which time the rotation of the bead flipper is stopped and the push button 6 is released to break the circuit in order to de-energize the electromagnet and allow the housing 64 to swing to its open position.

The resultant bead flipper which is then moved from the flipper machine will retain its desired true frusto-conical shape because the overlapping flap has been progressively stretched from a minimum adjacent the core to a maximum at the points of greatest diameter. The advantages are evident, since the flaps of the flipper cannot inadvertently move out of their inclined positions because of the progressive stretching to which they have been subjected.

It is apparent from the drawings and foregoing description that bead flippers may be formed in accordance with my invention to uniform and correct predetermined shape, and that they can be produced easily and economically with a minimum of manual labor and in a relatively short time.

Aside from the specific embodiments of the invention herein shown and described, it will be understood that numerous changes may be made without departing from the spirit and scope of this invention, and that it is not desired to limit the invention to the exact procedure herein set forth. I desire to claim the invention broadly as well as specifically, as indicated in the appended claims.

What I claim is:

1. The method of forming bead flippers which consists in folding a flipper strip around a bead core, stretching the sides of said strip a greater amount at their marginal edges than at portions adjacent to said core, and simultaneously pressing said sides together to complete the bead flipper.

2. The method of forming bead flippers which consists in folding a flipper strip around a bead core, stretching the sides of said strip in an angular direction to provide the same with a maximum amount of stretch at their free edges and a minimum amount of stretch at portions adjacent to said core, and simultaneously pressing said strips together to form a frusto-conical flange encircling said core.

3. The method of forming bead flippers which consists in rotating a bead core, feeding a fabric flipper strip to said core adjacent to the inner face thereof, forming said strip around the inner and side faces of said core, increasingly amount adjacent to the outer face of said core to a maximum amount at their free marginal edges and at the same time pressing said sides together and forming the same to a frusto-conical shaped ring extending around said core.

4. The method of forming bead flippers which consists in rotating a continuous bead core, feeding a fabric flipper strip to said core adjacent to the inner face thereof at a speed substantially greater than the peripheral speed of said core, forming said strip around the inner and side faces of said core, increasingly stretching the sides of said strip extending beyond said core from a minimum amount adjacent to the outer face of said core to a maximum amount at the free edges thereof, and at the same time angularly positioning said sides relative to said core and pressing said sides together to form a continuous dished rim encircling said core.

5. The method of forming bead flippers which consists in rotating a continuous bead core, feeding a frictioned flipper strip to said core adjacent to the inner face thereof at a speed substantially greater than the peripheral speed of said core, stretching the sides of said fabric extending beyond the outer face of said core in an angular direction to vary the degree of stretch of the same, and at the same time folding one of said sides around the outer face of said core and pressing said sides together in a plane inclined to the outer face of said core to form a continuous frusto-conical shaped flange surrounding said bead core.

6. The method of uniting a bead core and a flipper strip in predetermined relationship which consists in rotating a continuous bead core, feeding a flipper strip to said core adjacent to the inner face thereof at a speed substantially greater than the peripheral speed of said core, folding said strip around the inner and side faces of said core, forming the sides of said strip projecting beyond the outer face of said core to a substantially V-shape, folding one of said sides of said strip over the outer face of said bead core into engagement with the other of said sides and at the same time stretching said engaged sides of said strip a greater amount at their free marginal edges than at portions adjacent to said core, and pressing said sides together to form a frusto-conical flange surrounding said bead core.

7. The method of forming bead flippers which consists in folding a flipper strip about the inner circumferential face and lateral faces of a circular bead core with the portions of the strip projecting outwardly beyond the core, rotating said core and strip, pressing the projecting portions of the strip together at an angle to the axis of the core, and at the same time stretching the projecting portions in progressively greater amounts from the outer face of the core to the marginal edges thereof.

8. The method of forming bead flippers which consists in folding a flipper strip about the inner circumferential face and lateral faces of a circular bead core with the portions of the strip projecting outwardly beyond the core, rotating said core and strip, pressing the projecting portions of the strip together at an angle to the axis of the core, forming a circumferential distortion in said projecting portions adjacent said core whereby when formed said projections will extend flatly and smoothly from said core, and at the same time stretching the projecting portions in progressively greater amounts from the outer face of the core to the marginal edges thereof.

9. In a method of forming bead flippers, the steps of rotating a bead core, feeding a flipper strip to the inner face of said core and prior to engaging said strip and core, gathering the portions of the strip lying outwardly of the core.

10. In a method of forming bead flippers, the steps of rotating a bead core, feeding a flipper strip to the inner face of the core, and prior to folding the strip about the core substantially stretching the portions of the strip lying outwardly of the core.

11. In a method of forming bead flippers, the steps of rotating a bead core, feeding a flipper strip to the inner circumferential face of said core, and then wrapping the central portion of the strip about the radial sides of said core while yieldably gripping said core and strip and causing the outer portions of the strip to assume a V-shape.

12. The method of forming bead flippers which consists in rotating a bead core, feeding a flipper strip to the inner circumferential face of said core, gathering the portions of the strip lying outwardly of said core in advance of contact between said face and said strip, folding said portions about the radial sides of said core, stretching the sides of said strip a greater amount at their marginal edges than at portions adjacent to said core, and simultaneously pressing said sides together to complete the bead flipper.

13. The method of forming bead flippers which consists in rotating a bead core, feeding a flipper strip to the inner circumferential face of said core, gathering the portions of the strip lying outwardly of said core in advance of contact between said face and said strip, folding said portions about the radial sides of said core, increasingly stretching the sides of said strip from a minimum amount adjacent to the outer face of said core to a maximum amount at their free marginal edges and at the same time pressing said sides together and forming the same to a frusto-conical shaped ring extending around said core.

14. The method of forming bead flippers which consists in rotating a bead core, feeding a flipper strip to the inner circumferential face of said core, gathering the portions of the strip lying outwardly of said core in advance of contact between said face and said strip, folding said portions about the radial sides of said core, stretching the sides of the strip extending beyond the outer face of said core in an angular direction to vary the degree of stretch of the same, and at the same time folding one of said sides around the outer face of said core and pressing said sides together in a plane inclined to the outer face of said core to form a continuous frusto-conical shaped flange surrounding said bead core.

15. The method of forming bead flippers which consists in rotating a bead core, feeding a fabric flipper strip to said core adjacent to the inner face thereof, stretching the portions of the strips extending outwardly of the core, forming said strip around the inner and side faces of said core, increasingly stretching the sides of said strip from a minimum amount adjacent to the outer face of said core to a maximum amount at their free marginal edges and at the same time pressing said sides together and forming the same to a frusto-conical shaped ring extending around said core.

16. The method of forming bead flippers which consists in rotating a bead core, feeding a fabric flipper strip to said core adjacent to the inner face thereof, forming said strip around the inner and side faces of said core, increasingly stretching the sides of said strip from a minimum amount adjacent to the outer face of said core to a maximum amount at their free marginal edges and at the same time pressing said sides together and forming the same to a frusto-conical shaped ring extending around said core, while yieldably gripping the bead portion of said flipper.

17. The method of forming bead flippers which consists in rotating a continuous bead core, feeding a fabric flipper strip to said core adjacent to the inner face thereof at a speed substantially greater than the peripheral speed of said core, forming said strip around the inner and side faces of said core, increasingly stretching the sides of said strip extending beyond said core from a minimum amount adjacent to the outer face of said core to a maximum amount at the free edges thereof, and at the same time angularly positioning said sides relative to said core and pressing said sides together to form a continuous dished rim encircling said core while yieldably gripping the bead portion of said flipper.

HAROLD A. DENMIRE.

CERTIFICATE OF CORRECTION.

Patent No. 1,956,982.                                                                 May 1, 1934.

HAROLD A. DENMIRE.

It is hereby certified that error appears in the printed specification of the above numbered patent requiring correction as follows: Page 6, line 78, claim 3, after "increasingly" insert the words stretching the sides of said strip from a minimum; and that the said Letters Patent should be read with this correction therein that the same may conform to the record of the case in the Patent Office.

Signed and sealed this 19th day of June, A. D. 1934.

<div style="text-align:right">Bryan M. Battey</div>

(Seal)                                                              Acting Commissioner of Patents.